United States Patent
Souma et al.

(10) Patent No.: US 7,783,237 B2
(45) Date of Patent: Aug. 24, 2010

(54) DEVELOPING BLADE

(75) Inventors: Shinji Souma, Shinagawa-ku (JP); Hiroshi Nakamura, Takayama (JP)

(73) Assignee: Fujikura Rubber Ltd., Tokyo (JP)

( * ) Notice: Subject to any disclaimer, the term of this patent is extended or adjusted under 35 U.S.C. 154(b) by 172 days.

(21) Appl. No.: 12/281,150

(22) PCT Filed: May 18, 2007

(86) PCT No.: PCT/JP2007/060650

§ 371 (c)(1), (2), (4) Date: Aug. 29, 2008

(87) PCT Pub. No.: WO2007/138990

PCT Pub. Date: Dec. 6, 2007

(65) Prior Publication Data

US 2009/0016780 A1    Jan. 15, 2009

(30) Foreign Application Priority Data

May 26, 2006    (JP) .............................. 2006-146219

(51) Int. Cl.
G03G 15/08    (2006.01)
(52) U.S. Cl. ..................................... 399/284
(58) Field of Classification Search ................ 399/110, 399/119, 120, 252, 265, 279, 284
See application file for complete search history.

(56) References Cited

U.S. PATENT DOCUMENTS

| 5,447,815 A | * | 9/1995 | Kato et al. ............... 430/108.3 |
| 5,604,573 A | | 2/1997 | Endo et al. |
| 7,067,225 B2 | * | 6/2006 | Watanabe et al. ...... 430/123.51 |
| 2008/0145662 A1 | | 6/2008 | Nakamura et al. |

FOREIGN PATENT DOCUMENTS

| JP | 7 333983 | 12/1995 |
| JP | 2003 98825 | 4/2003 |
| JP | 2005 62474 | 3/2005 |

OTHER PUBLICATIONS

U.S. Appl. No. 12/278,850, filed Aug. 8, 2008, Nakamura, et al.

* cited by examiner

*Primary Examiner*—Hoan Tran
(74) *Attorney, Agent, or Firm*—Oblon, Spivak, McClelland, Maier & Neustadt, L.L.P.

(57) ABSTRACT

The blade member of the invention is composed mainly of silicone rubber and contains as an additive component at least one selected from the group consisting of ultra-high molecular-weight-polyethylene, carbon nanotube, and fullerene. It is thus possible to decrease the coefficient of friction of silicone rubber in a practical range and without detrimental to its flexibility or other physical properties to let the developing blade slip off more, thereby diminishing the amount of abrasion of the rubber and improving on the robustness of the developing blade without detrimental to image quality. Decreasing the coefficient of friction to let the developing blade slip off more has additional advantages: a decrease in the force of contact of the developing blade with a developing roll, which contributes more to energy savings resulting from the size reductions of a driving motor, and making the developer equipment compact.

6 Claims, 8 Drawing Sheets

DEVELOPING BLADE

TECHNICAL ART

The present invention relates generally to a developing blade, and more specifically to a developing blade used with developer equipment for electrophotographic imagers such as laser printers, copiers and facsimiles.

BACKGROUND ART

An imager making use of an electrophotographic imaging process comprises developer equipment for developing latent images on a photosensitive drum.

For this developer, as shown typically in FIG. 5, there is a developer 71 known so far in the art, which is of the structure that comprises a hopper 72, a developing roller 73, a rotatable agitator 74 and a developing blade 75 (see JP(A)2003-43812, etc.).

With this developer 71, a toner 76 in the hopper 72 is fed by the agitator 74 to the developing roller 73 so that the toner in thin layer form is uniformly carried on the peripheral surface of the developing roller 73 by frictional electrification between the developing blade 75 and the developing roller 73. And then, the toner 76 passes from the developing roller 73 onto a photosensitive drum 77 with a latent image formed on it for development.

The developing blade 75 known so far in the art, for instance, is of the structure that comprises a blade member 84 of resilient material formed along the end side of a metallic support member 82.

The resilient material used for the blade member 84 of the developing blade 75, for instance, is formed of silicone rubber. The resilient member of such silicone rubber is configured into a given shape by mixing a cross-linking agent (curing agent) with the silicone rubber, casting the mixture into a mold cavity, and curing it there.

Not until now is there any attempt at intentionally adding additives into silicone rubber to let it have some specific functions, because there is the need of taking full advantage of the superior physical properties that the silicone rubber has by itself, for instance, flexibility, heat resistance, durability, etc.

However, introducing improvements in the robustness of the blade member 84 of resilient material makes sure product quality is assured over extended periods of time; so it would be a factor of vital importance.

The situation being like such, the invention has for its object to improve on the robustness of a developing blade without detrimental to image quality by decreasing the friction coefficient of silicone rubber in a practical range and without detrimental to its flexibility or other physical properties of the silicone rubber to let the developing blade slip off more, thereby diminishing the amount of abrasion of the rubber.

DISCLOSURE OF THE INVENTION

According to the invention, that object is achieved by the provision of a developing blade having a blade member on an end side of a supporting member, wherein said blade member is composed mainly of silicone rubber and contains as an additive component at least one selected from the group consisting of ultra-high molecular-weight-polyethylene, carbon nanotube, and fullerene.

In a preferable embodiment of the inventive developing blade, the aforesaid ultra-high molecular-weight-polyethylene is in powder form having a molecular weight of 1,000,000 or higher and an average particle size of 20 to 125 μm, and is contained in an amount of 5 to 40 parts by weight per 100 parts by weight of silicone rubber.

In a preferable embodiment of the inventive developing blade, the aforesaid ultra-high molecular-weight-polyethylene has an activated surface on which —OH and —COOH groups are formed.

In a preferable embodiment of the inventive developing blade, the aforesaid carbon nanotube is contained in an amount of 2 to 10 parts by weight per 100 parts by weight of silicone rubber.

In a preferable embodiment of the inventive developing blade, the aforesaid fullerene is contained in an amount of 0.5 to 5 parts by weight per 100 parts by weight of silicone rubber.

In a preferable embodiment of the inventive developing blade, the aforesaid blade member has a coefficient of friction of 1.2 or less.

In the inventive developing blade, the blade member is composed mainly of silicone rubber and contains as an additive component at least one selected from the group consisting of ultra-high molecular-weight-polyethylene, carbon nanotube, and fullerene. It is thus possible to decrease the coefficient of friction of silicone rubber in a practical range and without detrimental to its flexibility or other physical properties to let the developing blade slip off more, thereby diminishing the amount of abrasion of the rubber and improving on the robustness of the developing blade without detrimental to image quality. Decreasing the coefficient of friction to let the developing blade slip off more has additional advantages: a decrease in the force of contact of the developing blade with a developing roll, which contributes more to energy savings resulting from the size reductions of a driving motor, and making the equipment compact.

BEST MODE FOR CARRYING OUT THE INVENTION

The best mode for carrying out the invention is now explained.

Figure 1:
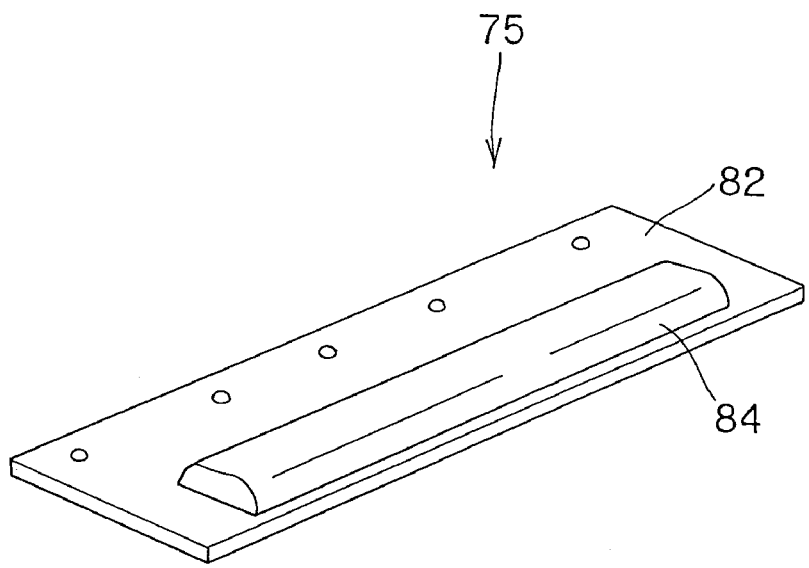
FIG. 1 is illustrative in perspective of one example of the inventive developing blade.

The invention relates to a developing blade 75 comprising a blade member 84 on an end side of a support member 82, as shown typically in FIG. 1, and part of the invention lies in the composition material of that blade member 84.

The blade member 84 being part of the invention is composed mainly of silicone rubber, and further contains as an additive component at least one selected from the group consisting of ultra-high molecular-weight-polyethylene, carbon nanotube, and fullerene.

Figure 2:
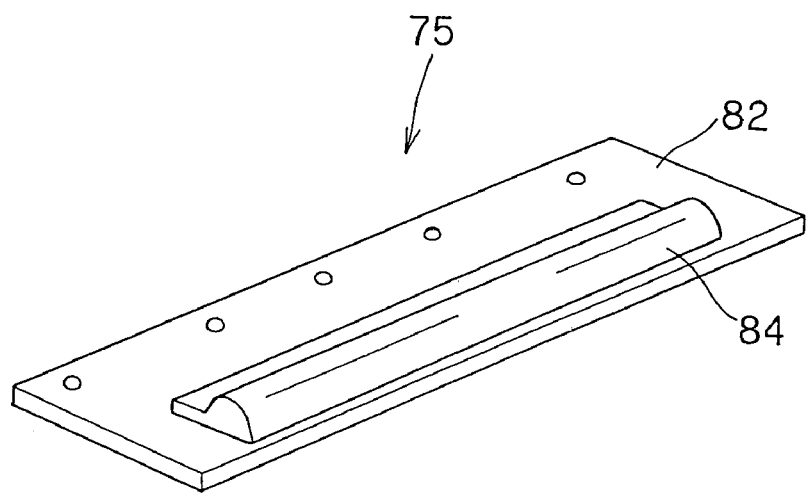
FIG. 2 is illustrative in perspective of another example of the inventive developing blade.
Figure 3:
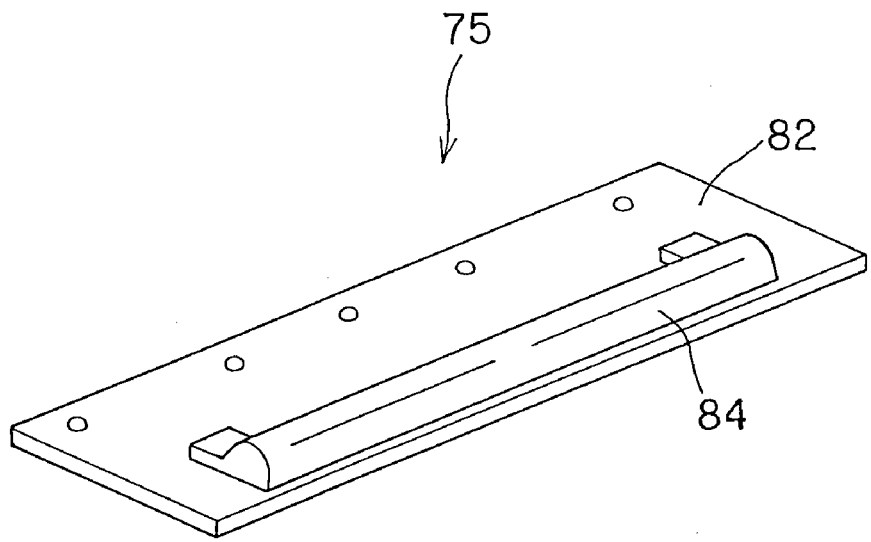
FIG. 3 is illustrative in perspective of yet another example of the inventive developing blade.
Figure 4:
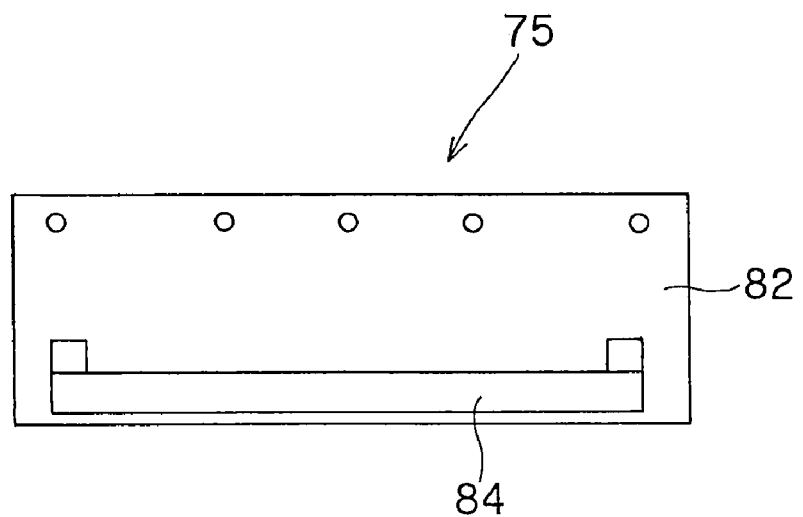
FIG. 4 is a plan view of FIG. 3.
Figure 5:
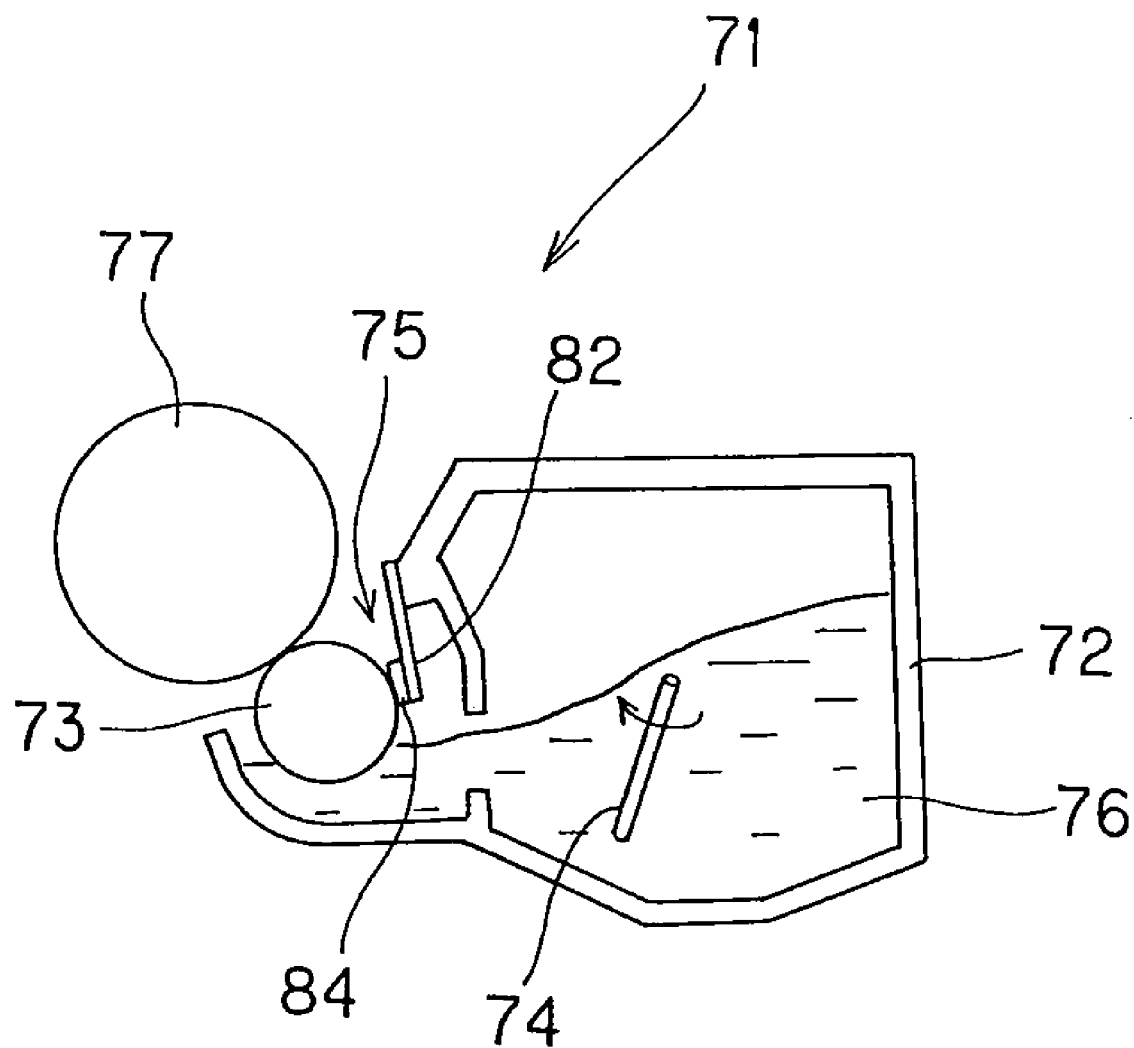
FIG. 5 is illustrative of one example of the structure of the developer equipment.

There is no particular limitation imposed on the configuration of the blade member 84 used here; for instance, it may be configured as shown typically in FIGS. 1, 2 and 3. For the support member 82, for instance, metal substrate such as those of stainless steel, and phosphor bronze for springs may optionally be used. A ceramic or resinous substrate may just as well be used.

The silicone rubber that is the main component of the blade member 84, for instance, may be a mixture of liquid silicone rubber with a curing agent.

The additive components to be added to the silicone rubber are each now explained in greater details.

[Ultra-high Molecular-weight-polyethylene]

The ultra-high molecular-weight-polyethylene used here is in powdery form having a molecular weight of 1,000,000 or higher in general and 1,000,000 to 5,000,000 in particular, and an average particle size of 20 to 125 μm, preferably 35 to 100 μm. The ultra-high molecular-weight-polyethylene may have fine particles of titanium carbide kneaded in it.

Preferably, the ultra-high molecular-weight-polyethylene used here has an activated surface with —OH and —COOH groups formed on it. This is because the activated surface allows that polyethylene to be improved in terms of the dispersibility in, and adhesion to, the silicone rubber.

Such ultra-high molecular-weight polyethylene is contained in an amount of 5 to 40 parts by weight per 100 parts by weight of silicone rubber. In less than 5 parts by weight, there is inconvenience that the addition of the ultra-high molecular-weight-polyethylene contributes less to the decrease in the coefficient of friction and the improvement in abrasion resistance. In greater than 40 parts by weight, on the other hand, there can be inconvenience that the amount of the ultra-high molecular-weight polyethylene added becomes excessive, so that the flexibility or other physical properties of the silicone rubber go beyond practically allowable ranges.

For the ultra-high molecular-weight-polyethylene, for instance, preference is given to those available from Fluoroseal Co., Ltd. the USA in the trade name of Inhance, and from Mitsui Chemical Industries, Co., Ltd. in the trade name of Mipelon.

[Carbon Nanotube]

The carbon nanotube used here is preferably the one that has been synthesized by such processes as plasma CVD (chemical vapor deposition), thermal CVD, surface cracking, fluid vapor-phase synthesis, and arc discharge.

Such carbon nanotube is contained in an amount of 2 to 10 parts by weight per 100 parts by weight of silicone rubber.

In less than 2 parts by weight, there is inconvenience that the addition of the carbon nanotube contributes less to the decrease in the coefficient of friction and the improvement in abrasion resistance. In greater than 10 parts by weight, on the other hand, there can be inconvenience that the amount of the carbon nanotube added becomes excessive, so that the flexibility or other physical properties of the silicone rubber go beyond practically allowable ranges.

[Fullerene]

Fullerene represented by $C_{60}$ or $C_{70}$ as an example has a molecular structure where a number of carbon atoms are arranged in spherical cage configuration. The carbon skeleton of fullerene is a carbon allotrope having a three-dimensional hollow, spherical shell structure closed up by the covalent bond of $sp^2$ carbon hybrid orbits having strain, and its molecular structure is made up of a polyhedron comprising a pentagon and a hexagon.

To improve on the dispersibility and adhesion of fullerene in and to the main component silicone rubber, it is desired that its surface be chemically modified and denatured by a variety of known methods.

Such fullerene is contained in an amount of 0.5 to 5 parts by weight per 100 parts by weight of silicone rubber. In less than 0.5 part by weight, there is inconvenience that the addition of fullerene contributes less to the decrease in the coefficient of friction and the improvement in abrasion resistance. In greater than 5 parts by weight, on the other hand, there can be inconvenience that the amount of fullerene added becomes excessive, so that the flexibility or other physical properties of the silicone rubber go beyond practically allowable ranges.

EXAMPLES

The invention is now explained at great length with reference to some specific examples.

Experimental Example 1

The ultra-high molecular-weight-polyethylene ("Inhance" Model No. UH-1250) was readied up as the additive to be added to the main component silicone rubber.

This ultra-high molecular-weight-polyethylene had an average particle size of 30 μm and a molecular weight of about 500,000 to 6,000,000.

The additive consisting of such ultra-high molecular-weight-polyethylene was added in such parts by weight per 100 parts by weight of silicone rubber as set out in Table 1 to prepare various samples to be measured for physical properties.

Each sample was measured for (1) hardness (Duro-A): JIS K6253, (2) tensile strength: JIS K6251, and (3) elongation: JIS K6251. A blade sample capable of actually functioning as a developing blade was prepared, and actual running experimentation was carried out with that blade sample built in the developer equipment of an electrophotographic imager. In the results of running experimentation, symbol "○" indicates that the blade sample is judged to have no problem, and "X" indicates that it is judged to have a problem. Referring here to the boundary level for judgment, whenever there was a streak or band occurring upon imaging is judged to have a problem.

The results are set out in Table 1.

TABLE 1

| Sample No. | Content of ultra-high molecular-weight-polyethylene (parts by weight) | Hardness (Duro-A) | Tensile strength (MPa) | Elongation (%) | Results of experiment of the blade sample built in the imager |
|---|---|---|---|---|---|
| I-1 (Comp) | 0 | 60 | 9.72 | 275 | ○ |
| I-2 | 5 | 64 | 6.66 | 153 | ○ |
| I-3 | 10 | 67 | 6.52 | 146 | ○ |
| I-4 | 20 | 72 | 6.78 | 123 | ○ |
| I-5 | 30 | 78 | 6.82 | 94 | ○ |
| I-6 | 40 | 81 | 6.63 | 85 | ○ |
| I-7 (Comp) | 50 | 84 | 6.57 | 77 | X |
| I-8 (Comp) | 60 | 88 | 7.28 | 74 | X |
| I-9 (Comp) | 70 | 90 | 7.12 | 63 | X |
| I-10 (Comp) | 80 | Incapable of production | | | X |

From the results set out in Table 1, it has been found that when the ultra-high molecular-weight-polyethylene is used as the additive in the content of 5 to 40 parts by weight, there is no particular problem arising in letting the blade sample function as a developing blade.

Then, friction/abrasion testing was conducted in the following way, using a specimen prepared with the composition (having an ultra-high molecular-weight-polyethylene content of zero) of Sample I-1, and a specimen prepared with the composition (having an ultra-high molecular-weight-polyethylene content of 20 parts by weight) of Sample I-4 in the aforesaid Table 1.

Friction/Abrasion Testing

Figure 6:
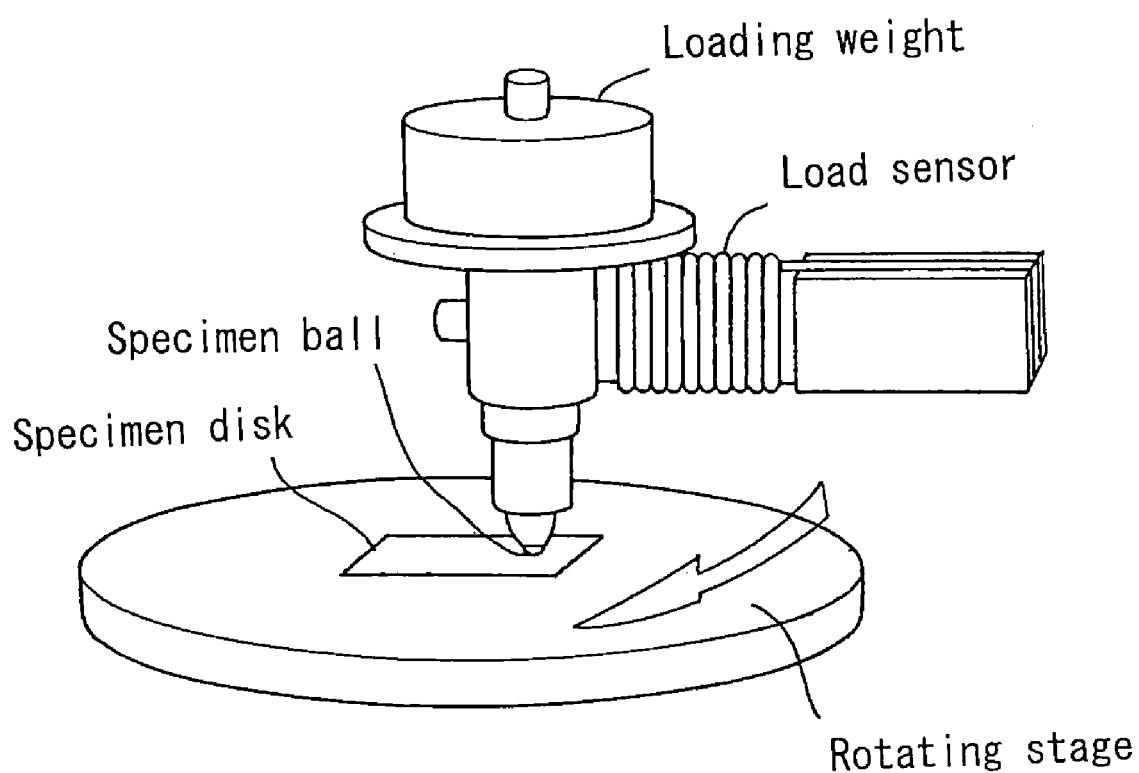
FIG. 6 is illustrative in schematic of the measuring apparatus for friction and abrasion testing.

The measuring apparatus is schematically shown in FIG. 6.

As shown in FIG. 6, a specimen disk was fixed to a rotating stage for contact with a specimen ball fixed from above. In this case, jigs used for the specimen ball and the fixation of the ball were set in such a way as to remove vertical loads on the specimen ball by the adjustment of the whole balance by gimbals. With a loading weight placed on the specimen ball, a vertical load corresponding to the loading weight was applied on the specimen via the specimen ball. After the specimen was shifted off the center of the rotating stage by a preset distance, the stage was rotated to let the specimen slip over a circumference with the distance preset on the specimen as radius. The ensuing frictional force between the specimen and the specimen ball was measured on a load sensor.

The measuring conditions involved were:

Loading weight: 50 g;

Preset radius: 3 mm;

Speed of rotation: 15 rpm; and

Linear speed: 1.88 mm/sec.

Figure 7:
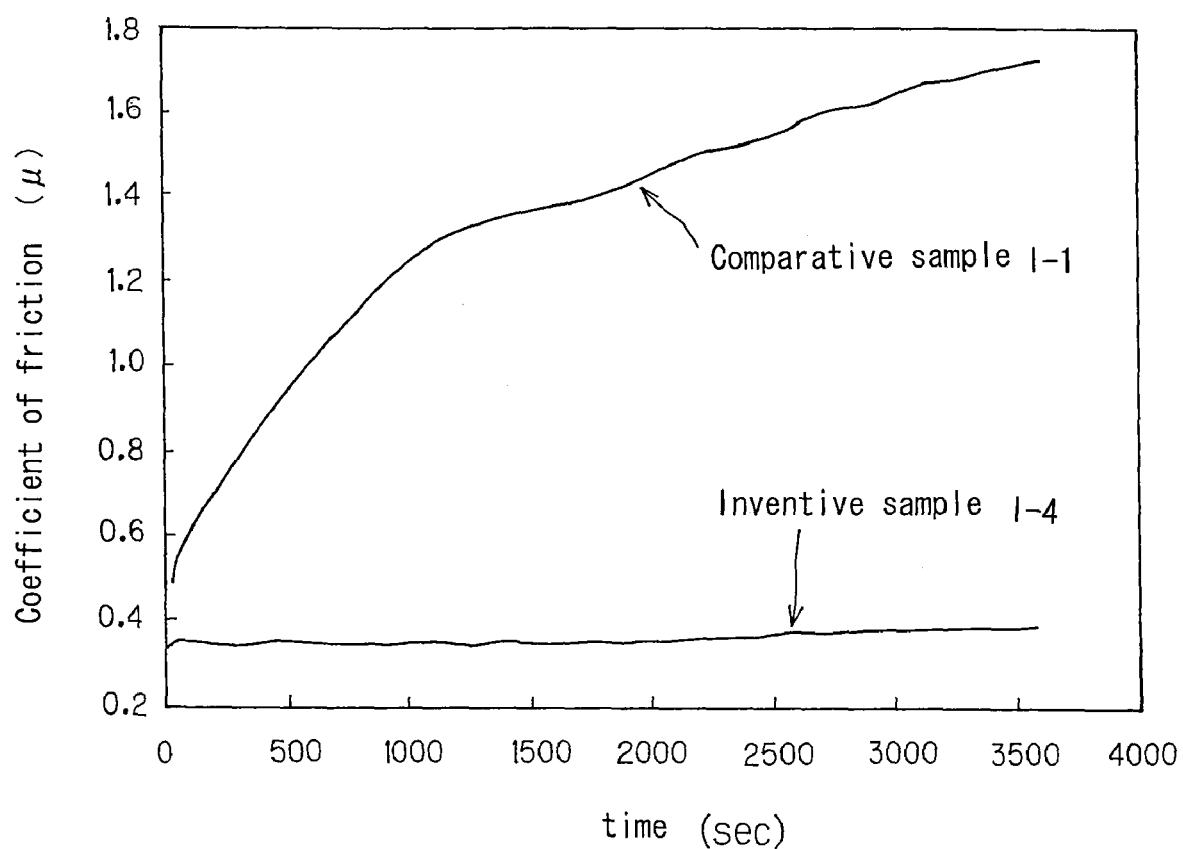
FIG. 7 is a graph indicative of the results of friction and abrasion testing.

The results are plotted in the graph of FIG. 7, from which it has been found that the inventive sample I-4 (containing 20 parts by weight of ultra-high-molecular-weight-polyethylene) has the coefficient of friction kept very low over extended periods of time.

Next, a rotary type of abrasion testing was conducted in the following way, using a specimen prepared with the composition (having an ultra-high molecular-weight-polyethylene content of zero) of Sample I-1, a specimen prepared with the composition (having an ultra-high molecular-weight-polyethylene content of 5 parts by weight) of Sample I-2 and a specimen prepared with the composition (having an ultra-high molecular-weight-polyethylene content of 20 parts by weight) of Sample I-4.

Rotary Type Of Abrasion Testing

Figure 8:
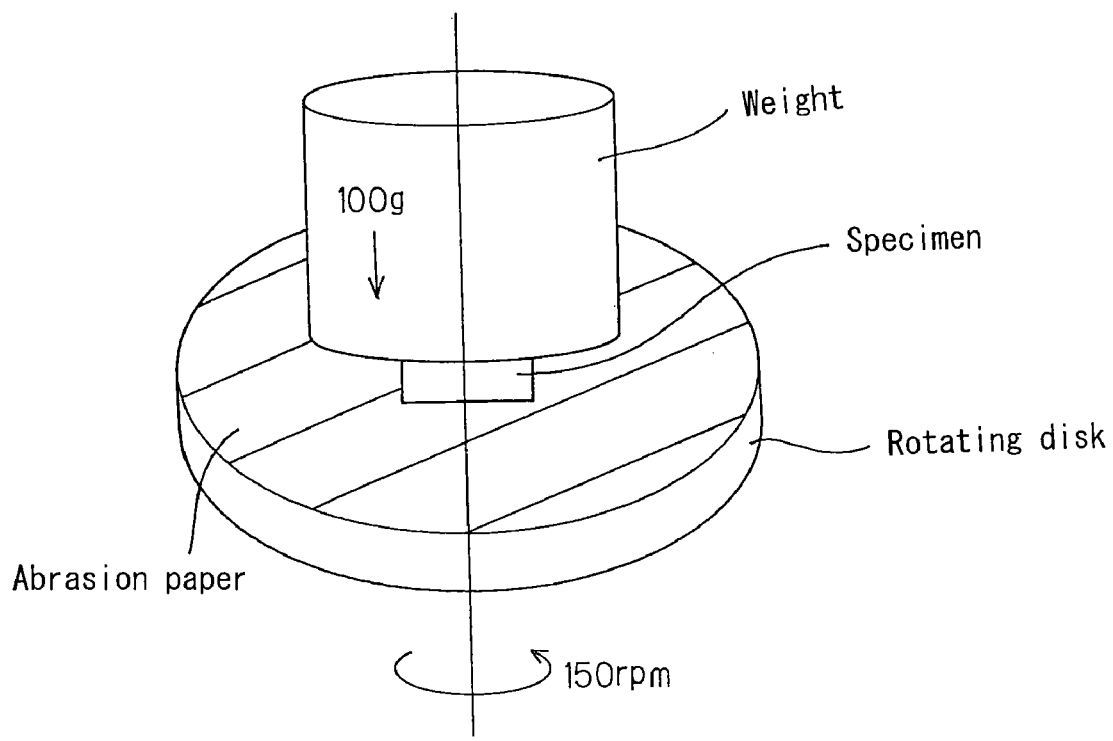
FIG. 8 is illustrative in schematic of how to implement measurement in a rotary type of abrasion testing.

The measuring method is schematically illustrated in FIG. 8.

The experimental method was conducted in the following way:

(1) The specimen was fixed and held on a weight.

(2) The weight was a constant load 100 g.

(3) Abrasion paper #2400 was fixed on a rotating disk.

(4) With the specimen placed on the rotating disk having the aberration paper fixed on it under the constant load of 100 g, the disk was rotated at 150 rpm for 30 minutes to let the specimen wear away, thereby estimating the specimen for the degree of abrasion.

Before and after the testing, the specimen shape was measured on a surface roughness meter to find the amount of abrasion as a difference between before and after. The specimen shape was 45 mm in length, 10 mm in width and 1.5 mm in thickness.

The results are set out in Table 2 given below.

TABLE 2

|  | I-1 (Comparison) | I-2 (Invention) | I-4 (Invention) |
|---|---|---|---|
| Before-testing thickness (mm) | 1.48 | 1.48 | 1.48 |
| After-testing thickness (mm) | 1.31 | 1.38 | 1.40 |
| Abrasion loss (mm) | 0.17 | 0.10 | 0.08 |
| Amount of the specimen after testing (%) | 89 | 93 | 95 |

From the results set out in Table 2, it has been appreciated that the inventive samples: Sample I-2 (having an ultra-high molecular-weight-polyethylene content of 5 parts by weight) and Sample I-4 (having an ultra-high molecular-weight-polyethylene content of 20 parts by weight) perform much better in terms of abrasion resistance.

It has also been ascertained that in the aforesaid Experimental Example 1, even when the average particle size of the ultra-high molecular-weight-polyethylene powders was changed from 60 μm to 35 μm, 45 μm, and 125 μm, such similar tendencies as set out in Tables 1 and 2 and illustrated in FIG. 7 are obtainable.

It is noted that the ultra-high-molecular-weight-polyethylene used here as the additive has some remarkable effects when used in combination with silicone rubber and urethane rubber now widely used as rubber material for developing blades, especially silicone rubber that is inferior in abrasion resistance to urethane rubber.

Experimental Examples 2

The carbon nanotube (VGCF manufactured by Showa Denko Co., Ltd.) was readied up as the additive to be added to the main component silicone rubber.

The additive consisting of such carbon nanotube was added in such parts by weight per 100 parts by weight of silicone rubber as set out in Table 3 to prepare various samples to be measured for physical properties.

Each sample was measured for (1) hardness (Duro-A): JIS K6253, (2) tensile strength: JIS K6251, and (3) elongation: JIS K6251. A blade sample capable of actually functioning as a developing blade was prepared, and actual running experimentation was carried out with that blade sample built in the developer equipment of an electrophotographic imager. In the results of running experimentation, symbol "○" indicates that the blade sample is judged to have no problem, and "X" indicates that it is judged to have a problem. Referring here to the boundary level for judgment, whenever there was a streak or band occurring upon imaging is judged to have a problem.

The results are set out in Table 3.

TABLE 3

| Sample No. | Content of carbon nanotube (parts by weight) | Hardness (Duro-A) | Tensile strength (MPa) | Elongation (%) | Results of experiment of the blade built in the imager |
|---|---|---|---|---|---|
| II-1 (Comp) | 0 | 60 | 9.72 | 275 | ○ |
| II-2 | 2 | 63 | 7.92 | 205 | ○ |
| II-3 | 5 | 66 | 7.03 | 180 | ○ |
| II-4 | 10 | 68 | 5.92 | 154 | ○ |
| II-5 (Comp) | 20 | Incapable of production | | | X |

From the results set out in Table 3, it has been found that when the carbon nanotube is used as the additive in the content of 2 to 10 parts by weight, there is no particular problem arising in letting the blade sample function as a developing blade.

Then, friction/abrasion testing was conducted in much the same way as in Experimental Example 1, using a specimen prepared with the composition (having a carbon nanotube content of zero) of Sample II-1, and a specimene prepared with the composition (having a carbon nanotube content of 10 parts by weight) of Sample II-4.

Figure 9:
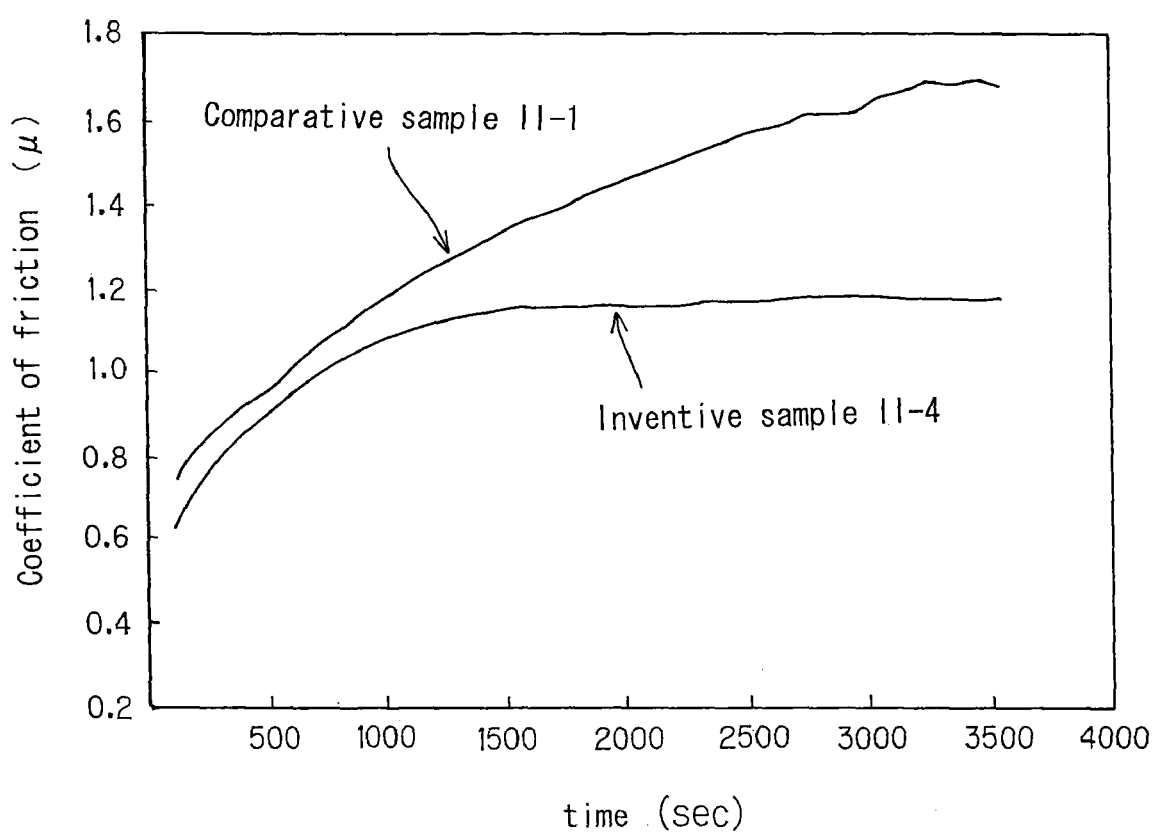
FIG. 9 is a graph indicative of the results of friction and abrasion testing.

The results of measurement are plotted in the graph of FIG. 9, from which it has been found that the inventive sample: sample II-4 (having a carbon nanotube content of 10 parts by weight) has the coefficient of friction kept low over extended periods of time.

Experimental Example 3

A fullerene (comprising about 60% by weight of $C_{60}$ and about 25% by weight of $C_{70}$ with the rest being other higher-order fullerenes)—produced by arc discharge—was readied up as the additive to be added to the main component silicone rubber.

The additive consisting of that fullerene was added in such parts by weight per 100 parts by weight of silicone rubber as set out in Table 4 to prepare various samples to be measured for physical properties.

Each sample was measured for (1) hardness (Duro-A): JIS K6253, (2) tensile strength: JIS K6251, and (3) elongation: JIS K6251. A blade sample capable of actually functioning as a developing blade was prepared, and actual running experimentation was carried out with that blade sample built in the developer equipment of an electrophotographic imager. In the results of running experimentation, symbol "○" indicates that the blade sample is judged to have no problem, and "X" indicates that it is judged to have a problem. Referring here to the boundary level for judgment, whenever there was a streak or band occurring upon image formation is judged to have a problem.

The results are set out in Table 4.

TABLE 4

| Sample No. | Content of fullerene (parts by weight) | Hardness (Duro-A) | Tensile strength (MPa) | Elongation (%) | Results of experiment of the blade built in the imager |
|---|---|---|---|---|---|
| III-1 (Comp) | 0 | 60 | 9.72 | 275 | ○ |
| III-2 | 0.5 | 59 | 7.71 | 239 | ○ |
| III-3 | 1 | 57 | 6.70 | 225 | ○ |
| III-4 | 2 | 56 | 6.07 | 235 | ○ |
| III-5 | 5 | 45 | 5.57 | 399 | ○ |
| III-6 (Comp) | 10 | Incapable of production | | | X |

From the results set out in Table 4, it has been found that when the fullerene is used as the additive in the content of 0.5 to 5 parts by weight, there is no particular problem arising in letting the blade sample function as a developing blade.

Then, friction/abrasion testing was conducted in much the same way as in Experimental Example 1, using a specimen prepared with the composition (having a fullerene content of zero) of Sample III-1, and a specimen prepared with the composition (having a fullerene content of 5 parts by weight) of Sample III-5.

Figure 10:
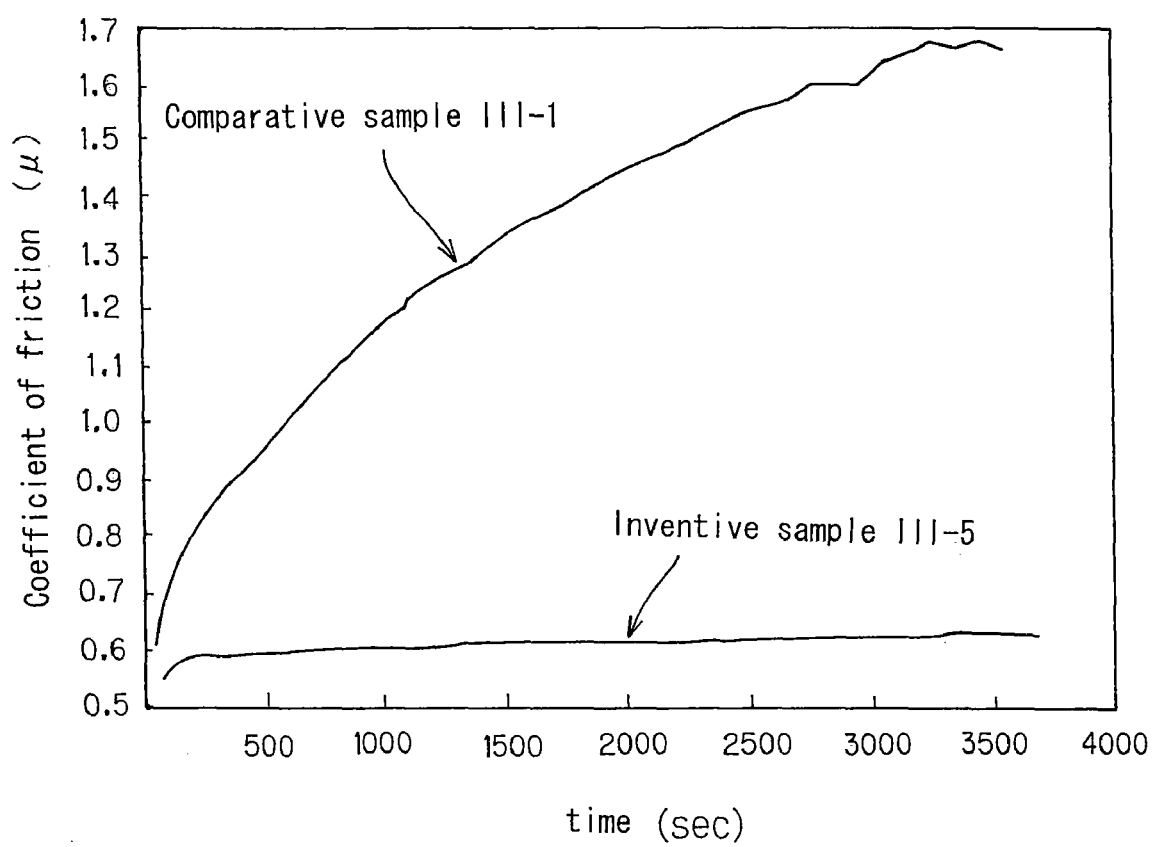
FIG. 10 is a graph indicative of the results of friction and abrasion testing.

The results of measurement are plotted in the graph of FIG. 10, from which it has been found that the inventive sample: Sample III-5 (having a fullerene content of 5 parts by weight) has a coefficient of friction kept very low even over an extended period of time.

From the results as mentioned above, the advantages of the invention would be undisputed. That is, the blade member here is composed mainly of silicone rubber and contains as an additive component at least one selected from the group consisting of ultra-high molecular-weight-polyethylene, carbon nanotube, and fullerene. It is thus possible to decrease the coefficient of friction of silicone rubber in a practical range and without detrimental to its flexibility or other physical properties to let the developing blade slip off more, thereby diminishing the amount of abrasion of the rubber and improving on the robustness of the developing blade without detrimental to image quality. Decreasing the coefficient of friction to let the developing blade slip off more has additional advantages: a decrease in the force of contact of the developing blade with a developing roll, which contributes more to energy savings resulting from the size reductions of a driving motor, and making the equipment compact.

INDUSTRIAL APPLICABILITY

The invention could be used for the production of developing blades used with the developer equipment of eletrophotographic imagers.

What we claim is:

1. A developing blade having a blade member on an end side of a supporting member, characterized in that said blade member is composed mainly of silicone rubber and contains as an additive component at least one selected from the group consisting of ultra-high molecular-weight-polyethylene, carbon nanotube, and fullerene.

2. The developing blade of claim 1, wherein said ultra-high molecular-weight-polyethylene is in powder form having a molecular weight of 1,000,000 or higher and an average particle size of 20 to 125 μm, and is contained in an amount of 5 to 40 parts by weight per 100 parts by weight of silicone rubber.

3. The developing blade of claim 2, wherein said ultra-high molecular-weight-polyethylene has an activated surface on which —OH and —COOH groups are formed.

4. The developing blade of claim 1, wherein said carbon nanotube is contained in an amount of 2 to 10 parts by weight per 100 parts by weight of silicone rubber.

5. The developing blade of claim 1, wherein said fullerene is contained in an amount of 0.5 to 5 parts by weight per 100 parts by weight of silicone rubber.

6. The developing blade of claim 1, wherein said blade member has a coefficient of friction of 1.2 or less.

* * * * *